United States Patent [19]

Mudge, Jr. et al.

[11] Patent Number: 5,236,230
[45] Date of Patent: Aug. 17, 1993

[54] COUPLING ASSEMBLY

[75] Inventors: J. Kris Mudge, Jr.; Shosuke Sone, both of Houston, Tex.

[73] Assignee: N.S. Pipe Technology, Inc., Houston, Tex.

[21] Appl. No.: 697,610

[22] Filed: May 9, 1991

[51] Int. Cl.$^5$ ............................................. F16L 15/04
[52] U.S. Cl. ...................... 285/55; 285/334; 285/355; 285/332.2
[58] Field of Search ............... 285/55, 333, 334, 355, 285/349, 332.2, 334.3

[56] References Cited

U.S. PATENT DOCUMENTS

| | | |
|---|---|---|
| 906,225 | 12/1908 | Harrison . |
| 2,907,589 | 10/1959 | Knox . |
| 3,100,656 | 8/1963 | MacArthur ............... 285/333 X |
| 3,253,841 | 5/1966 | Ahmad ...................... 285/55 |
| 3,266,821 | 8/1966 | Safford .................... 285/332.2 |
| 3,298,716 | 1/1967 | Taylor et al. ............. 285/55 |
| 3,572,777 | 3/1971 | Blose . |
| 4,398,754 | 8/1983 | Caroleo et al. .......... 285/334.3 |
| 4,679,831 | 7/1987 | Kielminski . |
| 4,705,307 | 11/1987 | Chelette . |
| 4,955,645 | 9/1990 | Weems ...................... 285/355 |

FOREIGN PATENT DOCUMENTS 3542523 7/1987 Fed. Rep. of Germany ... 285/332.2

Primary Examiner—Eric K. Nicholson
Attorney, Agent, or Firm—Bush, Moseley & Riddle

[57] ABSTRACT

A pipe coupling assembly of threaded and coupled (T and C) type for forming well strings by operably connecting lengths of pipe or tubes in a coaxially aligned relationship. The interior longitudinal bore of the pipes are preferably lined or coated with a corrosion resistant material. A plastic corrosion barrier seal ring is operably positioned in a recess in the longitudinal bore of the coupling member to protect the metal-to-metal seals, torque shoulders and engaged threads of the coupling assembly and pipes from contact with corrosive fluids. The plastic seal ring prior to thread make up is substantially rectangular in cross-section with a radial dimension between the outside and inside diameter or width equal to a greater than 1.5 times the axial or longitudinal height. With this dimension ratio the plastic seal ring is secured against displacement from the desired sealing position during controlled thread make up in the hostile environment at a well site which deforms only the inner radial portion of the height dimension.

11 Claims, 2 Drawing Sheets

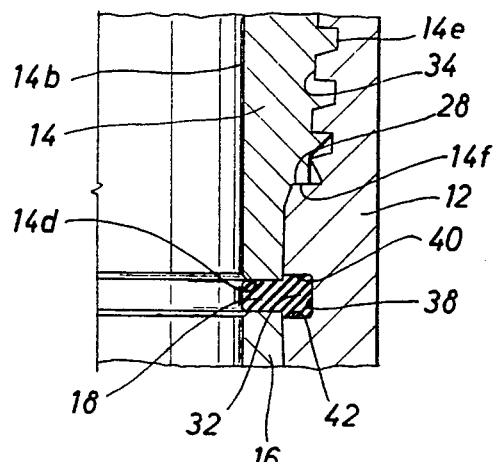
FIG. 3
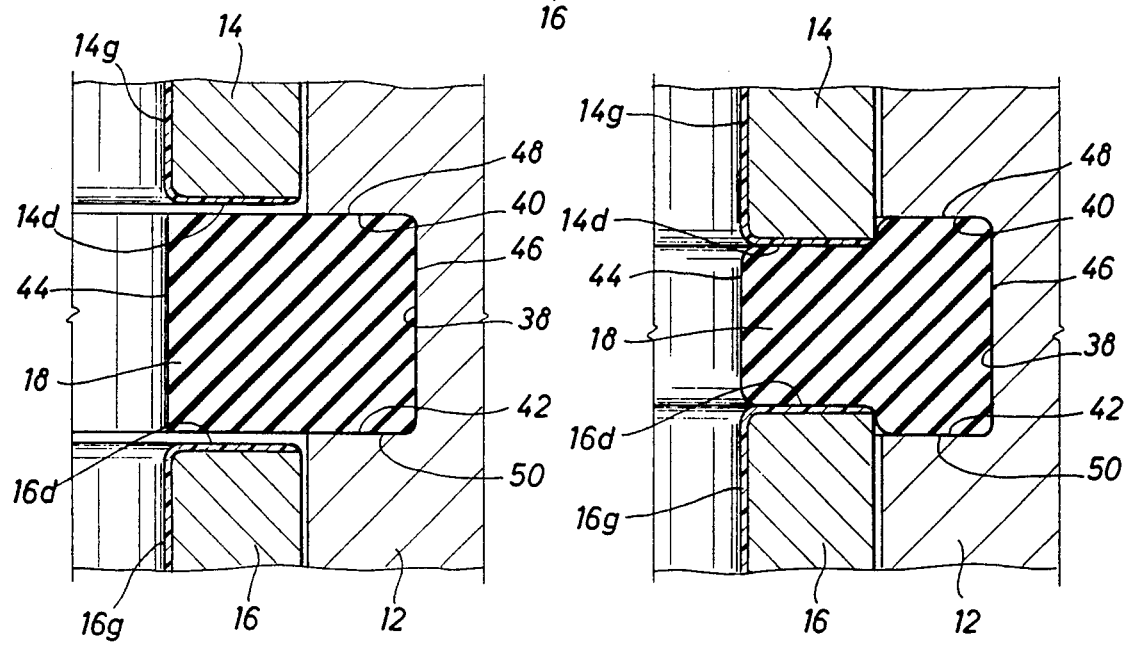
FIG. 4A
FIG. 4B
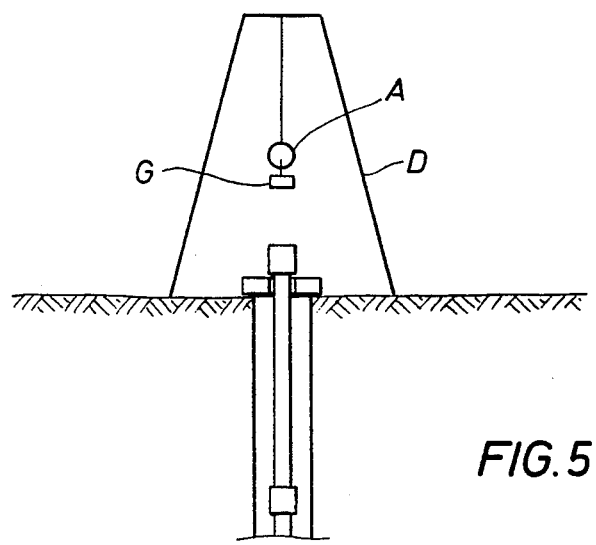
FIG. 5

COUPLING ASSEMBLY

BACKGROUND OF THE INVENTION

1. Field Of The Invention

The present invention relates broadly to the field of a coupling assembly, and more particularly to the field of a threaded coupling assembly for use in forming a tubular conduit string used in wells.

2. Background Art

Coupling assemblies for structurally or operably joining or connecting separate items or components to form useful machines and articles of manufacture are well known in many applications. One such known application is in handling fluids (gases, vapors, liquids or combinations thereof including entrained or suspended solid matter) by operably connecting or joining lengths of tubular conduits, tubes or pipes to form a pipe spool, flow line or fluid handling system providing a desired, contained, continuous, internal fluid flow passage or path between two spaced locations. An essential requirement of a coupling assembly in many flow line applications is the capability to repeatedly and quickly assemble or disassemble the pipe or tubes into the connected desired flow system. Pipe coupling assemblies usually, but not always, employ some form of a helical thread or screw arrangement for joining, securing or connecting the pipe ends in flow communication. This threaded construction also enables the pipe coupling to be repeatedly reused rather than being replaced each time the pipes are connected for forming the fluid handling system. Such pipe couplings also normally include means for sealing the connected pipe sections to contain or prevent escape or leakage of fluid from or into the internal flow passage of the pipe between the two locations. Some examples of releasable and reusable coupling assemblies used for pipe connection purposes include the following U.S. patents:

| U.S. PAT. NO. | Patentee | Class/Subclass |
| --- | --- | --- |
| 2,635,900 | Mayo | 285/59 |
| 3,163,448 | Franklin | 285/137 |
| 3,680,188 | Mason et. al. | 29/157 |
| 3,686,747 | Bagnulo | 29/5508 |
| 4,621,841 | Wakefield | 285/158 |
| 4,695,080 | Oetiker | 285/334 |

See also British patent document no. 1,174,208 to Benter-Werke Aktiengesellschaft.

Wells bored, drilled or otherwise formed into the earth's crust for a wide variety of useful purposes involving fluid handling are also known. In drilling or boring such wells it is common practice to provide a circulation system for drilling fluids. In the recovery of hydrocarbons, minerals and other forms of energy such as geothermal, it has been useful to form wells that penetrate into the earth's crust to obtain access to the desired subsurface target or formation. Some wells are used for disposal or injection of waste, usually hazardous, into a subsurface earth formation. Other wells are used for temporary storage of hydrocarbons. Tubular well strings or conduits formed by connecting lengths of metal pipe or tubular conduits with coupling assemblies are widely used for many purposes in the well environment and in all phases or stages including drilling, casing, flowing and maintaining a well. By connecting the ends of the lengths of the pipe in an end to end or series flow communicating relationship with the coupling assemblies a well string of any practical desired length may be formed. The various applications, use or purposes of well strings create unique requirements for the coupling assemblies used to join the pipes or tubes.

Such tubular well strings formed by the use of coupling assemblies have acquired various labels, names and meanings in the industry that while commonly used are not always precise and altogether free of confusion. For example, a well casing string is often arbitrarily distinguished by some from workover strings, production tubing, well liners or drilling strings by the various sizes and dimensions of the pipe as well as the intended purpose or use of the string in the well. As used herein the terms "well string" or "well conduit" shall be interchangeably defined to cover all sizes and all applications or of uses of operably connected tubular conduits, tubes or pipes in the well environment. There has also been definition confusion over the term or word "joint" in well applications. In one context that term has been used to designate the connection of the pipe ends (pipe joint) while in another context has been used to identify a certain length of pipe(pipe joint or joint of pipe). As employed herein the term "joint" will be used to describe or define a length of pipe.

For a number of reasons, including adequate strength and the capability of repeated make up or assembly, the preferred manner of coaxially connecting or securing the individual lengths of pipe with the coupling assembly to form the desired well string employs interengaged helical threads. The mating member having the external thread structure is commonly referred to as the pin while the member having the internal thread structure is frequently identified as the box. The interengaged thread structure may be formed or manufactured on a constant diameter (cylindrical) or on a taper (conical) relative to the longitudinal axis of the coupling or tube. By controlling the axial or longitudinal length of the thread engagement, a suitable area of thread engagement can be provided for carrying the anticipated load. In many well strings the engaged threads are not strained to plastic deformation when rotational made up for enabling the highly desirable repeated coupling use. The most common or widely used coupling assembly in well applications utilizes metal pipes or tubes having external helical pin threads that engage mating internal box threads formed in the longitudinal bore of a metal coupling member, sleeve or collar. This type of coupling assembly is often referred to a threaded and coupled (or simply T&C) to distinguish from other forms of pipe couplings used in forming well strings or conduits. Normally, but not always, the coupling assembly for well strings also provides a fluid seal between the connected pipes. Seals for the coupling assembly to prevent leakage of fluid may be formed by metal-to-metal contact or some form of gasket depending on coupling geometry and intended application. Various well pipe coupling assemblies thread profiles, seals and their arrangement or geometry as well as their materials of construction are commonly known and some have become industry (American Petroleum Institute or API) standards. Coupling assemblies for forming well strings are commercially available from a large number of manufacturers, including the assignee of the present invention, that conform to either API and proprietary specifications.

While many well strings are exposed to, conduct or otherwise contact fluids that are not damaging to metals others are exposed to well fluids are highly corrosive to many metals. When such corrosive fluids are encountered or anticipated to be present in a particular well, special precautions must usually be taken to protect the well string from failure induced or accelerated by corrosive attack. Special corrosive resistant alloy materials of construction may be used in some instances to form the well conduit components exposed to the corrosive fluids, but that approach is usually undesirable due to the much greater cost of the alloy materials. In addition, corrosion resistant metal alloy materials often lack adequate strength qualities to carry the loading forces or safely withstand the localized high stress and strain loading created by the interengaged threads or metal-to-metal seals in these applications. Lined well conduits have also been employed to solve this corrosion problem as their cost is often not as great and they retain the strength quality and elastic strain capability of alloy steel. Both internal metal and plastic linings have been employed as protective corrosion barriers to isolate or shield the metal tubes and couplings of these well conduits from exposure to contact with the corrosive fluids present or flowing through the interior flow passage or bore of the well conduits. While such lined construction has been generally successful in protecting the well conduit there have been problems and failures. Generally such protective barrier failures occur in the vicinity of the pipe ends and coupling assembly as a result of fluid leakage due to failure of the corrosion barrier seal employed. Such corrosion barrier seal failure may result from any one of a multitude of factors. Due to the high level of tensile stress resulting from the combined force loadings, the seal and threaded areas of the pipe or coupling are particularly vulnerable to corrosive attack when a corrosion barrier seal fails. The long felt need for a dependable, rugged corrosion barrier seal for a tube or pipe coupling assembly that can be reliably assembled to form a string in the hostile environment at a well site has been widely recognized.

Examples of prior art patents for well string coupling assembly applications include the following:

| U.S. PAT. NO. | Patentee | Class/Subclass |
|---|---|---|
| 2,261,566 | Russell et. al. | 285/371 |
| 2,487,241 | Hilton | 285/334.2 |
| 3,266,821 | Safford | 285/55 |
| 4,507,842 | Werner | 285/371 |
| 3,572,777 | Blose | 285/334 |
| 4,679,831 | Kielmanski | 285/332.2 |
| 4,568,113 | Axford et. al. | 285/334 |
| 4,655,485 | Albrecht et. al. | 285/333 |
| 4,706,997 | Carstensen | 285/13 |
| 4,711,474 | Patrick | 285/332.3 |
| 4,856,828 | Kessler et. al. | 285/334.1 |
| 3,100,656 | MacArthur | 285/55 |
| 4,830,411 | Tsuru et. al. | 285/334 |

As disclosed in expired Russell U.S. Pat. No. 2,261,566, it is known to use threaded tubular coupling assemblies having a coupling member formed with internal threads for coaxially connecting lengths of tubes or pipes having external threads and an internal corrosion resistent coating of organic resin or the like for forming a tubular well string or conduit is known. To protect the highly stressed threaded area of the pipe and coupling member from the corrosive fluids, Russell employs as a corrosion barrier a metal fitting or sleeve having a corrosion resistent coating for sealing with the mated pipe ends and which extends into the bore of the tubes. No annular stop or torque shoulders are provided by the Russell coupling assembly for limiting rotational make up of the pipe external threads to position the pipe ends in a predetermined relationship to the metal fitting or coupling. If the threads are inadvertently rotationally made up for too great a longitudinal distance or length into the coupling member, the corrosion barrier fitting may be displaced from the proper sealing position at the pipe ends or even destroyed therebetween by crushing.

The Hilton patent U.S. Pat. No. 2,487,241 discloses a pipe coupling assembly in which a resilient corrosion resistant annular gasket is trapped between and fills the otherwise open annular gap within the coupling between the opposed pipe ends to provide a corrosion barrier seal and a continuous smooth interior surface to flow. The smooth interior flow passage between the tubes is desirable as it protects the pipe and coupling from damage by eliminating turbulent, erosive flow resulting from the gap between the connected pipe. To withstand crushing by the tube ends and displacement from the sealing location by a greater pressure external to the coupling, the resilient gasket must be reinforced to maintain its desired sealing capability. No torque or stop shoulders are provided on the coupling assembly for limiting thread make up and positioning of the pipe ends in the coupling member to prevent such crushing or inadvertent forcing or displacement of the gasket by the pipe ends from the sealing location.

In U.S. Pat. No. 3,266,821 to Safford a sealed pipe coupling is disclosed for use in corrosive and erosive well fluid service. The coupling sleeve threadedly engages the tapered threaded pipe in the usual manner, but the engaged thread area and resulting physical strength of the coupling is reduced by this arrangement. An annular recess is provided in the inner wall of the coupling between the longitudinally spaced threaded portion for receiving a plastic gasket. The plastic gasket is shaped to grip the external pipe threads during make up to prevent displacement. No torque shoulder engagement for limiting thread make up or effecting a metal-to-metal seal is provided.

Werner U.S. Pat. No. 4,507,842 also discloses a system for connecting plastic lined pipe joints using a tubular corrosion barrier liner sleeve that concentrically fits in the bores of the pipes. The liner sleeve is placed in the bore of the pipe coupling or collar during thread assembly of the connection and seals with the inside diameters of the pipe bores by a pair of longitudinally spaced O-rings. The linear sleeve forms an outwardly extending collar that is trapped in the coupling between the opposed pipe noses to maintain the desired positional relationship for sealing. The restricted internal open area of this liner construction is undesirable both for limiting internal flow capacity and preventing use of through the bore or flow line movable well tools.

In Blose U.S. Pat. No. 3,572,777, the use of an annular resilient gasket between the pipe ends and within the coupling in place of the an inwardly projecting integral collar on the coupling sleeve is disclosed for use in severe and corrosive well fluid service. The plastic gasket, due to a flange and shoulder construction arrangement, is T-shaped in cross-section prior to make up. An internal groove is machined in the coupling sleeve to a longitudinal dimension to accommodate the flanges rather than the gasket shoulders. If the threads are correctly made up the undercut portions of the pipe ends trap the flanges against the coupling to prevent the gasket from being squeezed out. If the thin flanges are partially displaced from the groove during rotational make up of the threads, sealing integrity is lost. The secondary metal-to-metal seal is formed by engagement of shoulders formed on the pin and outer annular end shoulders of the coupling which also limits thread make up to prevent displacement of the plastic gasket.

U.S. Pat. No. 4,679,831 to Kielmanski discloses a pipe coupling assembly having a corrosion barrier formed by a floating metal ring substantially encased in a suitable resilient plastic jacketing or coating material. The floating ring eliminates turbulence corrosion at the coupling while enabling passage through the bore of movable hardware items, such as through the bore transportable well tools. Two longitudinally spaced grooves are formed in the coupling to provide the movement limit stops for the floating sealing ring. A tapered thread arrangement is employed which by torque build up limits thread make up. Due to the variable thread friction, such arrangement does not result in an assured precise positional relationship between the coupling and pipe for requiring the seal to float axially or longitudinally relative to the coupling. And even then the plastic coating may be crushed to destruction.

Axford U.S. Pat. No. 4,568,113 discloses the use of a generally tubular metal washer or ring carried within the coupling between the stainless line steel (bimetallic) pipe members to provide a continuous internal metallurgical corrosion barrier or primary seal when used in $H_2S$ or $CO_2$ service. The washer forms metal-to-metal seals with the stainless steel liner and is preferably made of the same stainless or other corrosion resistent material. Each of the engageable threaded surfaces has both a cylindrical and tapered portion.

The patent to Albrecht et. al. (4,655,485) discloses a deformable plastic ring for sealing in the engaged thread area rather than the pipe ends. One of the engaged thread surfaces is formed with a recess into which the plastic rings are placed. Upon thread make up the plastic is deformed sufficiently to provide the desired seal in the engaged thread area.

U.S. Pat. No. 4,706,997 to Carstensen discloses a coupling assembly having a separate floating internal precision makeup ring which serves as a makeup stop shoulder to control the tube positioning distance relative to the other tube upon make up, but does not consistently position the tube ends relative to the coupling member. A plastic seal ring is concentrically mounted between the separate tube end positioning ring and the outer coupling member to form the corrosion barrier. In other embodiments the integral internal ring or collar on the coupling maintains or traps a pair of plastic seal rings in position for sealing with exterior conical surfaces on the tubes but does not form a protective corrosion barrier for the coupling.

U.S. Pat. No. 4,711,474 to Patrick discloses use of a plastic seal ring located within the threaded area of a pipe coupling which precludes its use as a corrosion barrier. The plastic seal ring is carried in a groove in the threaded area on one member and sealingly engages with the threads on the mating member after make up.

Kessler U.S. Pat. No. 4,856,828 discloses the use of an annular rigid plastic liner sealing gasket for interior plastic coated pipe or tubes. The gasket forms a pair of flanges which extend into the pipe bore to seal with the cylindrical interior marginal surface of the tubing as well as effecting a separate seal of the center radial portion of the gasket with the pipe ends. Not only does such liner gasket construction create a downstream flow turbulence, it also blocks passage of well tools. No stop means for controlling thread make up to prevent crushing or forcing or displacement of the plastic gasket into the pipe bore are provided.

The MacArthur patent (3,100,656) discloses the use of a plastic corrosion ring barrier for sealing lined pipe in an integral tubular coupling. Integral threaded pipe coupling connections usually employ expensive, wall thickening upsets on the tubes to provide the necessary strength or structural integrity normally provided by the separate coupling sleeve member. The thickened portion of the box or internally threaded pipe member is provided with a single sided recess for receiving the plastic ring that is generally sealingly deformed to a "dumb bell" or I-shaped cross section configuration when fully compressively engaged by the pin nose upon thread make up. The plastic seal ring is slightly oversize in outer diameter in relationship to the outer wall diameter to provide an initial pre-compressed condition to control "writhing" during the relative rotation movement necessary to effect thread assembly. The seal ring, which is initially substantially square in cross section, has an inner diameter substantially equal to the bore diameter of the pipe for leaving an internal uninterrupted passage therethrough for movement of various well tools. As the plastic ring seals with the internal corrosion resistant lining of the tubes, the threads and annular make up shoulders are protected from undesired contact with the corrosive fluid.

U.S. Pat. No. 4,830,411, to Tsuru et. al., which is assigned to the assignee of the present invention, discloses a reusable threaded coupling for oil-well pipe service. The disclosed coupling forms a metal-to-metal annular seal and torque stop shoulder between the tubes and coupling member. The metal coupling member is exposed to the well fluids although a continuous smooth internal flow path is provided.

Each of the above indentified patents are hereby fully and completely incorporated in the written description of the present invention by this specific reference as if each so identified patent had been set forth verbatim herein.

SUMMARY OF THE INVENTION

The present invention relates generally to coupling assemblies and more particularly a threaded coupling assembly for use in forming a tubular conduit in a well.

The coupling assembly includes a tubular coupling member or sleeve having a longitudinally extending bore therethrough. The coupling member bore defines a symmetrical inner surface having a central recess for enabling interchangeable and reversible positioning use of the coupling member in the well string. Internal box helical threads formed in the bore defining inner surface interengage corresponding external pin threads formed on the opposed tubes for securing the tubes in a coaxially aligned flow communicating relationship with each other and the coupling member. Oppositely facing annular interior shoulders formed on the coupling member engage corresponding external shoulder on the tubes to limit rotational thread make up and provide torque shoulders to ensure proper thread make up while ensuring repeatability of the exact positioning of the tubes in a predetermined relationship to the coupling and each other. The engaged shoulders may also serve to form a metal-to-metal seal between the coupling and tube.

The coupling central annular recess receives and holds a plastic or resilient seal ring that engages the nose or ends of the opposed connected tubes to effect a barrier seal therebetween is made up to protect the coupling and unlined portion of tubes from contact with well fluids. The plastic ring, when formed of certain materials of construction, also serves as a corrosive barrier when used in conjunction with internally lined tubes or pipe. The barrier seal effected by the seal ring does not extend into the bore of the tubes to restrict flow or passage of through the bore movable well tools. The flush mounted seal ring provides a continuous smooth flow path between the ends of the make up tubes to protect against flow erosion caused by the coupling.

The seal ring is substantially rectangular in cross section prior to make up. The longitudinal or height dimension of the seal ring is substantially the same as that of the coupling member central recess. The radial cross section width [between the cylindrical outer diameter (O.D.) and inner diameter (I.D.)] of the seal ring is substantially equal to or greater than 1.5 times the seal ring height dimension to ensure reliable coupling assembly at the well site. A reliable seal is effected by the seal ring as the engaged torque shoulders precisely position the noses or ends of the connected tubes relative to the recess and gasket positioned therein upon each make up of the coupling assembly. The opposite ends or noses of the tubes controllably deform the portion of the seal ring adjacent the bores of the tubes to a T shaped cross section upon make up. Upon such make up the seal ring is also trapped in the recess by the pipe noses.

An object of the present invention is to provide a new and improved coupling assembly.

Another object of the present invention is to provide a new and improved coupling assembly for forming well conduits.

Yet another object of the present invention is to provide a new and improved coupling assembly having a corrosion barrier seal ring for use in forming well conduits.

BRIEF DESCRIPTION OF THE DRAWINGS

FIG. 3 is an enlarged view, in section, of a portion of the coupling assembly of the present invention.

FIG. 4A is a greatly enlarged view in section of a portion of the coupling assembly before the tubular ends are fully made up, showing the undeformed shape of a seal member.

FIG. 4B is a greatly enlarged view, in section, of a portion of the coupling assembly of the present invention detailing the seal relationships after tubular members are fully made up in the coupling assembly; and FIG. 5 is a simplified schematic view of typical equipment handling apparatus employed at a well site to assist in forming a well string using the coupling assembly of the present invention.

DESCRIPTION OF THE PREFERRED EMBODIMENTS

Figure 1:
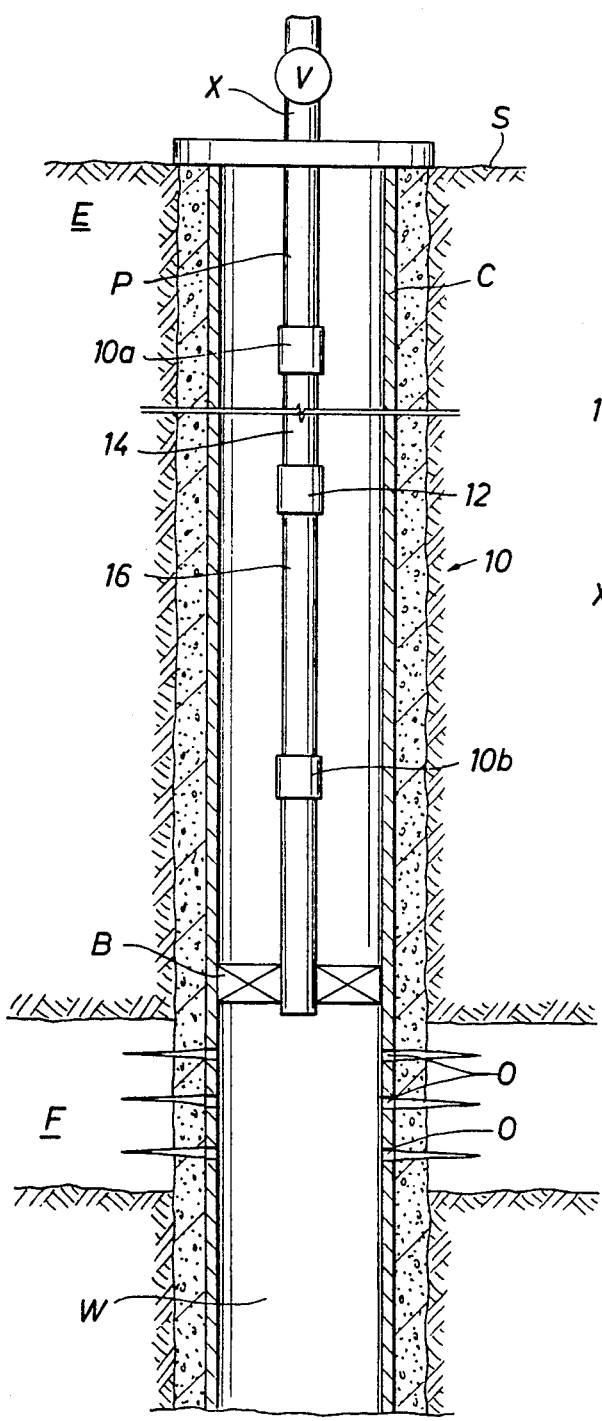
FIG. 1 is a side view, in section, of a well having a plurality of well conduits formed by the coupling assembly of the present invention.

FIG. 1 illustrates in cross section a well or borehole W drilled, bored or otherwise formed in the earth's crust E and extending from the earth surface S to a subsurface formation F. While the illustrated well W is typical of many used for recovery or production of hydrocarbons from the targeted subsurface earth formation F, wells are also known to be used for a wide variety of entirely different purposes. By way of non-inclusive example, such wells may have as their purpose the injection or flowing of fluids into the formation F to aid in secondary and tertiary recovery of hydrocarbons or disposal of waste, usually hazardous. Other wells, usually formed in salt domes, may be used for temporary storage of hydrocarbons or other fluids in underground caverns. While wells may be used for a wide variety of intended purposes, including many not described herein, they generally employ one or more well strings or conduits to achieve those purposes. A well will commonly employ or utilize one or more well strings at all of the various stages or phases of a well including drilling, casing, flowing, producing and maintaining a well so it should also be understood that the employment of a well conduit is not limited to just the well stage of intended use.

In the simplified well embodiment illustrated in FIG. 1, the well W is in the use phase or stage having only an outer tubular casing well string C and a production tubing well string P. Ordinarily the production tubing well string P is run or installed within the longitudinal internal bore or opening formed internally of the casing string C and sealed thereto with a packer assembly B to form a desired internal sealed flow path for the well fluids to the surface S. However, the internal bore in the casing string C may be used to form the hydrocarbon flow path between the formation F to surface C if desired. The casing well string C is more commonly used to line the open bore hole to prevent cave ins and may be permanently installed and supported in the well W by known cementing operations if desired. The casing C is normally perforated to form a plurality of openings O to enable the hydrocarbons to flow inside the well W from the subsurface formation F. It is also common practice on a well in the use phase to install a well head valving manifold, commonly known as a christmas tree X, on the casing well string C at the surface S to control flow from or into the well. The production tubing well string P is arranged in flow communication with and may be hung or vertically suspended or supported from the christmas tree X. Both of the illustrated well strings C and P may extend into the well W for a distance of several thousand feet. It will be appreciated by those skilled in the art that due to the distances involved a plurality of coupling assembly must be employed or used to coaxially join or connect lengths of tubes or conduits in a flow communicating series type arrangement to form either the casing well string C, or the production tubing well string P or a suitable well string for any other desired purpose.

The formation of well conduits or well strings provide a unique set of operating condition requirements or parameters for the plurality of coupling assemblies used to structurally join the lengths of pipes or tubular conduits while effecting the desired fluid seals. The weight load on each coupling assembly of the fully assembled well conduit may be substantial as a well W may extend several miles into the earth's crust C to the targeted subsurface formation F. When well strings are formed or supported from above, such as the illustrated production tubing P, the entire weight of the suspended well string must be safely carried by the well string coupling assemblies. Due to the increased cost of large diameter boring operations, the radial thickness difference between the outside diameter (O.D) and inside diameter (I.D) of the well conduit and coupling assembly, must be held to a minimum to provide a desirable large internal bore opening or flow area within the well string that also must fit with sufficient radial clearance within the well bore hole or other well conduits to enable installation. Fluid pressure differentials between the bore and exterior of a tubular well conduit tend to either burst or collapse the well string for adding to the hoop stresses of the coupling assemblies. In the recovery of hydrocarbons, the subsurface formation pressure may be sufficient to flow the hydrocarbons to the surface without the use of the pumps or the like. In the case of wells not having a sufficient formation pressure, it may be necessary to install pumps (not illustrated) in the well adjacent to the subsurface producing formation F to flow the hydrocarbons to the surface S. Such pumps may create dynamic forces that must also be supported by the well string along with the static forces. In these situations, the coupling assembly, within the permissible radial thickness, must provide sufficient structural strength to accommodate all of these static weight and dynamic force loadings as well as reliably sealing the well string to prevent leakage of fluid pressure either into or out of the internal passage or bore.

In many instances, the produced well fluids including the desired hydrocarbons are free of corrosive components for enabling use of unprotected alloy steel or other metals as the preferred material of construction for both the well tubes and coupling assemblies. However, in some wells W, notably deep high pressure natural gas producing wells, the produced well fluids that flow through the bore of one of the well conduits, usually the production tubing P, may have components that are highly corrosive to metal which would result in undesired premature failure of that well conduit. In certain situations such failures can cause catastrophic blow outs with the potential result of loss of life and extensive property damage.

Figure 2:
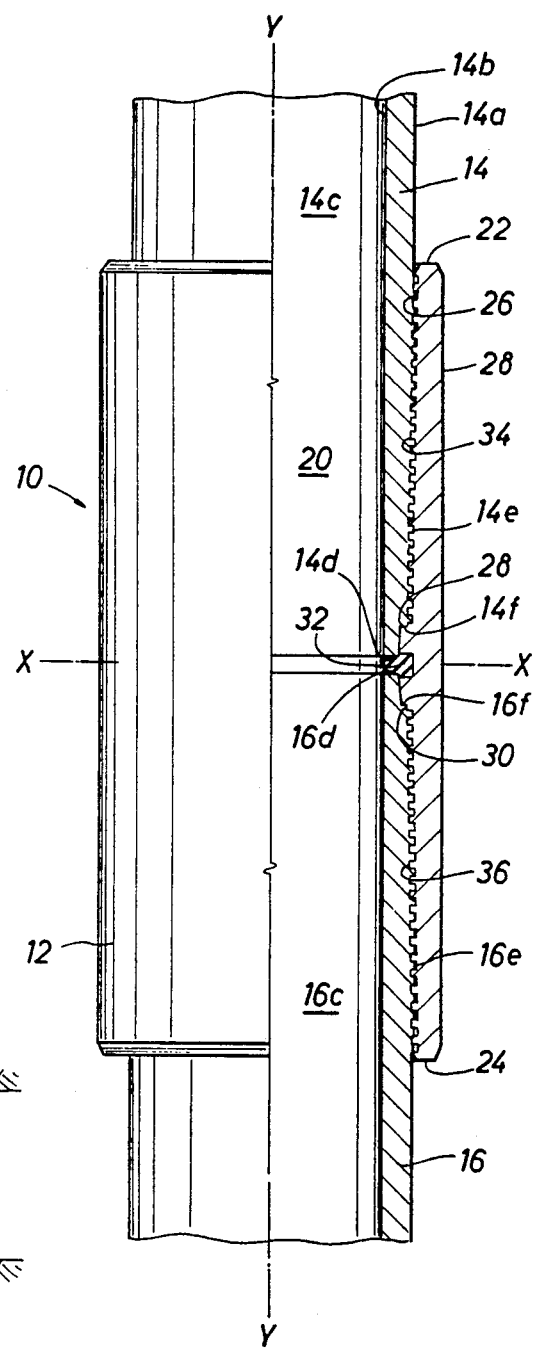
FIG. 2 is a side view, partially in section, of the coupling assembly of the present invention.

The coupling assembly of the present invention, generally designated or referenced as 10, is illustrated in the assembled or made up condition in FIG. 2. The coupling assembly 10 includes a coupling member 12, a pair of longitudinally aligned tubes 14 and 16 and a corrosion barrier gasket or seal means 18. As illustrated in FIG. 1, the coupling assembly 10 is employed for operably connecting or joining the two lengths of tubular conduits, tubes or pipes 14 and 16 in a longitudinally aligned or coaxial flow communicating relationship to form a desired well conduit. The coupling assembly 10 of the present invention will be described in the context or application of forming the production tubing P of the well W of FIG. 1, but should not be considered as limited to that specific well string application as the present invention may also be usefully employed in forming a well conduit or well string for any other desired application or use. It will also be appreciated that a plurality of well coupling assemblies 10a and 10b, identical to coupling assembly 10, will be used in a like manner to connect the other longitudinal end of pipes 14 and 16 with other lengths of pipe (identical to pipes 14 and 16) in a sequential or repeating flow communicating series relationship to form the desired production tubing well conduit P. To simplify or standardize manufacturing and assembly at the well site it is preferable that interchangeable coupling assemblies be used through a specific well string. As the approximate preferred longitudinal length of each pipe of tube for convenience in transportation is usually 30 feet, an assembled well string having an overall length of 3000 feet may employ a plurality of approximately one hundred coupling assemblies 10 of the present invention in forming a single well string.

The coupling assembly 10 includes a tubular or sleeve like coupling member 12 having a longitudinally extending bore 20 formed internally therethrough. The tubular coupling member 12 defines a longitudinal axis Y—Y which is illustrated in the usual vertical orientation when located in a well W and will be referred to as such herein. However, it should be understood that wells W are not always truly vertical as there may be cork screw spirals or other inadvertent forms of variation from the true vertical. If desired, a well may be intentionally deviated from the true vertical by directional drilling to intersect the subsurface target formation. And with current developing technology of horizontal directional drilling the longitudinal axis of the tubular coupling member may be in actual practice oriented substantially horizontal relative to a true vertical axis direction. Thus, while the present invention is described in the context of horizontal or vertical relationship, the present invention should not be considered so limited by those description references used herein in actual application or in determining its proper scope.

The metal tubular coupling, member 12 includes a first end or upper annular surface 22 and a lower end or second annular surface 24 that face in opposite longitudinal directions and having the internal flow passage way or central bore 20 extending therebetween. The longitudinally extending bore 20 of the tubular coupling member 12 forms an inner surface 26 extending between the first annular end-surface 22 and the second annular end-surface 24 which will be described further. The coupling member 12 also forms a generally cylindrical outer surface 27 that also extends between the upper annular end-surface 22 and the lower annular end-surface 24 for defining the exterior periphery or boundary of the coupling member. The exterior surface 27 is preferably formed on a constant dimension diameter passing through the longitudinal axis Y—Y of the coupling member 12. The interior or inner surface 26 is also generally machined or formed on a diameter passing through the longitudinal axis Y—Y, but that forming diameter varies in size along the longitudinal axis. The machined inner surface 26 of the coupling is preferably symmetrical about a horizontal plane or axis X—X located perpendicular to the longitudinal axis Y—Y and which defines the operable center plane or longitudinal midpoint of the coupling member 12, By forming annular end surfaces 22 and 24 the same distance from plane X—X that plane also bisects the coupling sleeve 12 into an upper or first half portion and a lower or second half portion.

For the sole purpose of describing the present invention herein, the adjective designation upper will be employed in identifying and describing the structure illustrated above the plane X—X of the coupling member 12 while the designation lower will be used to identify and describe the corresponding structure located below that plane. It being understood that in actual application, the tubular coupling 12, because of the symmetrical relationship of construction, may be reversed in longitudinal position to locate the second or lower structure above the first or upper structure.

As illustrated in FIG. 2, the inner surface 26 of the tubular coupling member 12 forms a first or upwardly facing make up stop annular surface or shoulder means 28 and a second or downwardly facing make up stop annular surface or shoulder means 30 within the longitudinal bore 20. The first and second annular shoulders 28 and 30 are spaced apart a predetermined longitudinal distance on the tubular coupling member and face in opposite longitudinal directions. Preferably, the shoulders 28 and 30 are equally longitudinally spaced from the horizontal plane X—X. While the first and second annular shoulders 28 and 30 are illustrated to be oriented substantially perpendicular to the longitudinal axis of the tubular coupling, it will be understood by those skilled in the art that such annular shoulders can be provided with an equivalent shape such as at a taper or an angle relative to the longitudinal axis or may be given a more complex surface shape without departing from the present invention. The fixed shoulders 28 and 30 serve many purposes in the present invention including thread make up rotational stop and torque shoulders and may further serve as metal-to-metal seal shoulders or surfaces. The shoulders 28 and 30 also engage the tubes 14 and 16, respectively, to effect their predetermined desired final positioning relative to the coupling upon proper thread make up.

Centered longitudinally between the oppositely facing annular shoulders, the inner surface 26 of the tubular coupling member 12 forms an annular groove or recess 32. The recess 32 is preferably centered on plane X—X to maintain the interior and overall symmetrical arrangement of tubular coupling member 12. Such symmetrical construction of the tubular coupling member 12 precludes incorrect assembly or make up of the well string as it enables installation with end surface 22 facing in either longitudinal direction. The recess 32 receives and positions the annular seal ring 18 during installation, assembly, or use of the coupling assembly 10 for sealing between the tubes 14 and 16.

The inner surface 26 of the tubular coupling member 12 includes or forms a first helical internal thread means 34 and a second helical internal thread means 36 for operably connecting or joining with the tubes 14 and 16. The first thread structure or means 34 is located adjacent and preferably longitudinally above the first annular shoulder 28 for threadedly engaging a corresponding helical external thread means on the first tubular conduit 14 for releasably securing or operably joining that tubular conduit in coaxial or longitudinal axis flow communicating alignment with the tubular coupling 12. The second thread structure means 36 is also formed in the bore of the inner surface 26 of the tubular coupling member 12 adjacent the second annular shoulder 30 for threadedly engaging a corresponding helical external thread means formed on the second tubular conduit 16 for releasably securing the second tubular conduit or pipe 16 in coaxial or longitudinal axis flow communicating alignment with the tubular coupling member 12. Preferably, but not necessarily, the first and second helical thread means 34 and 36 are identical in mating thread structure to enable the coupling member 12 to be interchangeably assembled in either direction in the well string. By relative rotation between the coupling member 12 and the tubes 14 and 16 in the conventional manner, the helical threads 34 and 36, respectively, are made up (assembled) or broken out (disassembled).

As illustrated in FIGS. 3 and 4, the recess 32 formed in the inner surface 26 of the tubular coupling member 12 for receiving the seal ring 18 includes an outer cylindrical surface 38 that is preferably formed on a constant diameter passing through the longitudinal axis Y—Y of the tubular coupling member 12. The upper and lower outer limits or longitudinal boundary of the recess 32 is formed by a pair of facing parallel annular surfaces 40 and 42 respectively, that are disposed so that the outer surface 38 of the recess 32 faces or opens radially inwardly toward the center of the bore 20 of the coupling member 12 to enable proper installation of the seal ring 18. The seal ring retaining or positioning surfaces 40 and 42 are equi-distant from plane X—X to maintain the longitudinal symmetry characteristic of the coupling member 12. While the pair of facing annular shoulder surfaces 40 and 42 are preferably formed at the illustrated right angles to the longitudinal axis Y—Y of the coupling member 12, it will be understood by those skilled in the art that the pair of facing annular surfaces 40 and 42 may be formed in an angular relationship or other suitable equivalent relationship to the longitudinal axis without departing from the present invention.

The separate resilient seal ring member or gasket means 18 operably disposed in the recess 32 forms a fluid barrier by sealing between the noses of the first pipe or tubular member 14 and the second pipe or tubular member 16 when each tubular member is positioned in a predetermined relationship to the recess 32 by proper thread make up to fully engage annular stop shoulders 28 and 30. By manufacturing or forming of the seal ring 18 from a selected, suitable material of construction that is resistent to the well fluids within the coupling assembly 10 a continuous internal corrosion barrier seal is provided between the pipe ends for protecting the coupling member 12 and the exterior of tubes 14 and 16 from any contact with the corrosive fluids. A preferred plastic material of construction is that sold under the trademark "TEFLON", but other equivalent materials may be used.

The resilient seal ring 18 includes an inner cylindrical surface 44 defining the central opening or bore and an outer cylindrical surface 46 that are radially spaced to form a width dimension of the seal ring 18. Preferably the inner surface 44 and the outer surface 46 are each formed on constant diameter or radius from the resulting longitudinal axis. The seal ring 18 further includes a first or upper annular end surface 48 and a second or lower annular end surface 50 that are longitudinally spaced apart and which connect with the inner and outer cylindrical surfaces 44 and 46. The longitudinal spacing between the parallel annular end surfaces 48 and 50 forms a height dimension of the seal ring 18. The height dimension is substantially the same as the longitudinal distance or dimension of the outer surface 38 of the recess 32 formed in the tubular coupling member 12 to enable placement, seating or securing of the resilient seal ring 18 within the recess 32 prior to, during and after thread make up. While the first and second annular end surfaces 48 and 50 of the resilient seal ring 18 are illustrated in the preferred form as being perpendicular to the longitudinal axis Y—Y, in practice they may be made to any suitable or equivalent shape or form to enable proper placement and fit between the pair of facing annular surfaces 40 and 42 of the recess 32. The cylindrical outer surface 46 of the seal ring 18 is sized or dimensioned for operably positioning adjacent the outer cylindrical surface 38 of the recess 32 so the longitudinal axis of the seal ring 18 is substantially coaxial with the longitudinal axis of the tubular coupling member 12. To ensure reliable positioning of the seal ring 18 in the recess 32 during thread make up of the coupling assembly 10 to obtain dependable formation of a proper flow erosion and corrosion barrier seal, the seal ring 18 is made substantially rectangular in cross section with the height substantially the same as the outer surface of the recess 32 and having a radial width that is at least 1.5 times the height of the seal ring. By maintaining this ratio of seal ring height and width dimensions, the seal ring 18 is rendered dimensionally stable in recess 32 during installation and thread make up so a dependable connection and a reliable seal can be made. The plastic seal ring 18 is provided with sufficient flexibility and resilience to enable temporary deformation to enable movement past shoulders 28 and 30 for proper placement between retaining shoulder surfaces 40 and 42 during its installation in recess 32. The inner cylindrical diameter 44 of the seal ring 18 is made the same as the inner diameter of the tubes 14 and 16 to provide a full opening bore for enabling passage of wire line or other through the bore movable well tools. The cylindrical inner diameter surface 44 of the seal ring 18 also provides a substantially continuous smooth interior flow surface to minimize flow turbulence and prevent flow erosion damage to the interior coating on the pipes or tubes.

The coupling assembly further includes the first and second lengths of pipe, tubular conduits or tubes 14 and 16 that are operably secured to the coupling member 12 to form the coupling assembly 10. For assembly interchangeability purposes it is preferred that each longitudinal end of each tube, pipe length or joint used 14 and 16 in a well string be manufactured or formed in the same way so they may be reversed in location for connection with the coupling member 12. If desired however, a different arrangement may be employed on the other end of any particular length, pipe or joint that is compatible with a different type of coupling member. Since both longitudinal ends of interchangeable pipes 14 and 16 will be manufactured to the same common specification, it is only necessary here to describe the structure of only one longitudinal end of the tube or pipe 14. The tube 14 includes an outer cylindrical surface 14*a*, an inner cylindrical surface 14*b* defining a longitudinal interior bore or central internal flow passage 14*c* and an annular shoulder, nose or end surface 14*d* at each end of the tube. The tube 14 forms a longitudinal axis that coaxial with the longitudinal axis Y—Y upon assembly and with the flow passage formed by the inner surface 14*c* in flow communication with the bore 20 of the coupling member 12. The inner surface 14*c* is preferably formed on a constant diameter throughout its longitudinal length to avoid a flow restriction or obstruction. The tube 14 includes an external helical thread means 14*e* formed on the outer surface 14*a* for threadedly engaging the corresponding first helical internal thread means 34 formed on the tubular coupling member 12 by relative circumferential rotation of the tube and coupling member in the conventional manner. External thread means 16*e* engage the corresponding internal threads 36 to secure the second tube 16 with the coupling member 12.

The tube 14 includes an outwardly facing annular shoulder 14*f* formed adjacent the external threads 14*e* with the outwardly facing annular shoulder preferably disposed between the threads and the annular end surface 14*d*. The close longitudinal proximity of the location of the end of the tube 14*d* relative to the annular shoulder 14*f* enables precise dimensioning and tolerancing. While the annular shoulder 14*f* can be located further away from the pipe end 14*d*, the illustrated construction is preferred for comparative ease of manufacture while maintaing the pipe end and precise dimensional and tolerance relationship with the coupling member 12 upon full rotational make up of the inner engaged threads. The annular stop shoulder 14*f* on the tube 14 engages the annular stop shoulder 28 formed on the tubular coupling member 12 for limiting rotational thread make up and the longitudinal insertion position of the tube 14 into the coupling member 12 to the proper position. The engagement of annular shoulders 14*f* and 28 also provides a primary torque shoulder to insure full and reliable rotational thread and seal make up at the well site and preventing inadvertent disengagement from improper torquing of the engaged helical threads. If desired, the engaged shoulders 14*f* and 28 may be used to form a conventional metal-to-metal radial seal in the event of leakage or a failure of the corrosion barrier seal ring.

Upon proper thread make up the tubes 14 and 16, the tube noses 14*d* and 16*d* are positioned relative to seal ring 18 and recess 32 by the engaged shoulders 14*f* and 16*f* in the manner illustrated in FIGS. 3 and 4 when fully made up. The tube noses or ends 14*d* and 16*d* are longitudinally spaced a smaller predetermined or controlled longitudinal distance than the seal ring 18 height dimension or height of recess 32. The tube noses 14*d* and 16*d* both engage and compressively deform the inner radial portion of the upper and lower annular surfaces 48 and 50 respectively, of the seal ring 18, to reliably effect the desired seal therebetween. This seal ring deformation is controlled as the tube and engagement is only adjacent the inner surface 44 and the seal ring height is only compressed by the predetermined distance the tube ends 14*d* and 16*d* overlap recess surfaces 40 and 42. As the outer radial portion of the seal ring 18 is not deformed by the tube ends 14*d* and 16*d*, it remains fully seated in the recess 32 between retaining surfaces 40 and 42. The uncompressed outer portion of the seal ring serves as a resilient buffer to maintain the desired seal in response to the tendency of the contained internal pressure to radially expand the seal ring 18. By deforming the seal ring 18 in this controlled manner the tubes 14 and 16 also serve to hold, secure, lock or maintain the seal ring 18 in operating or sealing position without forcing the seal ring 18 from the recess 32 or destroying it by crushing upon thread make up. The resulting cross sectional shape of the seal ring 18 after make up is that of a T on its side with the usually vertical leg of the T facing radially inwardly toward the bore 20. The inner cylindrical surfaces 44 of the deferred seal ring 18 form a flush, continuous, substantially smooth or uninterrupted surface between the inner surfaces 14*b* and 16*b* of the tubes 14 and 16 to minimize potentially damaging flow turbulence or flow erosion.

In FIG. 4, both the inner surface 14*b* and nose or end surfaces 14 of the tube 14 are coated or lined with a protective corrosion barrier 14*g* while the corresponding surfaces of the tube 16 are provided with a similar protective corrosion coating or lining barrier 16g. Because the seal ring 18 sealingly engages the corrosion barrier linings 14g and 16g of the tubes 14 and 16, a corrosion barrier seal is provided if the material of construction of seal ring 18 is chosen to be suitably resistent to the corrosive well fluids in the bores 14c and 16c of the tubes 14 and 16 or bore 20 of coupling 12. And as the seal ring 18 protects the entire coupling member 12 from exposure to the well fluids it is unnecessary to undertake the expensive procedures to coat or line that member for use in corrosive service. This arrangement for forming a corrosion barrier seal is simple in installation and operation as only a single seal ring is required and that may be installed in either direction. It is also a highly reliable corrosion barrier in that the engagement of annular stop shoulders upon thread make up also effects the proper deformation or compression of the seal ring 18 for sealing while preventing displacement of the seal ring 18 from the positioning recess 32 by the tubes 14 and 16.

The detailed arrangement of the structure, function relationship and operation of annular shoulder and the external threads on the tubes that make up with the coupling member are described in greater detail in U.S. Pat. No. 4,830,411 to Tsuru et. al. which, along with other mentioned patents, has been fully incorporated herein by specific reference. Other known equivalent stop shoulder, thread, and metal-to-metal structure may be employed if desired.

In FIG. 5 there is a schematic showing of a typical known apparatus commonly located at the well site that is used to assist in the assembly or disassembly of the well string. An elevated support frame or structure means D, such as a derrick, mast or crane is disposed above the well bore. Movably suspended from the support structure by a conventional cable arrangement means is a travelling block, or pulley sheave A that is used to controllably lift, lower or suspend the lengths of pipe or tubes 12 or 14 in a vertical position above the well bore when forming a well string. The travelling block A is releasably attached to the pipe lengths forming the well strips by suitable devices or mechanisms known as pipe elevators G which enable rotation of the pipe. By connecting the pipe elevators E with one end of a length of pipe, that particular pipe length upon upward movement of the travelling block will be rotatably suspended vertically above the well bore. Conventional pipe slip arrangements or mechanisms H may be used to temporarily fixedly support the connected pipe lengths placed in or remaining within the well bore. Suitable known automatic or manual operated means (not illustrated) for rotating the pipe supported by or suspended from the travelling block A are employed for effecting the desired relative rotational movement to effect thread engagement or disengagement with the coupling or pipe supported in the well by the slips. By sequencing operation of the slips H and travelling block A the various pipe lengths may be assembled by thread make up with the couplings into the well strings. And by reversing the operating sequence the well string may be disassembled. Other equivalent arrangements and mechanisms for aiding or assisting in the assembling or disassembling well strings at the well site are known to those skilled in the art.

THE USE AND OPERATION OF THE PRESENT INVENTION

Both ends of the metal tubes or pipes 14 and 16 as well as the coupling member 12 used to form the coupling assembly 10 for the desired well string are individually machined or otherwise formed to the illustrated or equivalent condition at a suitable manufacturing location or locations remote from the well site. Before shipment to the well it is frequently desirable and common practice to fully assemble the coupling member 12 with the end of only one of the tubes or pipes (14 or 16) to protect the engaged threads, shoulders and metal-to-metal seal during transportation or storage. The corrosion barrier seal ring 18 may be installed in the coupling member 12 at this time or shipped separately. Protective devices for the threads, shoulders and seals (not illustrated) are installed on the unassembled end of the coupling and on the other longitudinal end of the pipe or tube to be mated with a different coupling. If such partial or one end shipping connection assembly is omitted both ends of the coupling member and both ends of each pipe length are normally provided with suitable temporary end protectors prior to shipment to the well site.

After transportation to the well site, the length of pipe having the coupling already threadedly made up at one end is elevated to be placed in vertical alignment with the well bore at the earth surface with the assembled coupling end of the pipe located above the unconnected pipe end. The unconnected pipe end is then preferably made up with a similar coupling member supported by the slips. If the coupling member was not already assembled with one of the tubes, it is done so at the well site prior to being elevated and preferably after installation of the seal ring 18.

The end of the pipe length or tube to be connected is oriented vertically above the coupling and connected pipe length supported by the slips and maneuvered into position so the threads are properly aligned and can be stabbed into position for make up by rotating the suspended pipe relative to the coupling supported by the slips. If desired, this arrangement can be reversed with the coupling being stabbed and rotated rather than the tube. However, the preferred arrangement is to stab the pin or external threaded end of the tube into the box thread provided by the coupling held or supported by the slips. Longitudinal symmetrical construction of the tubular member enables positioning of the coupling in either direction for providing great flexibility in making up the coupling assembly to form the well string.

Before stabbing the suspended unconnected pipe end into the coupling, the corrosion barrier ring is inserted into the recess 32 in the coupling bore 20 if not already done. Such insertion is a relatively simple procedure that can be quickly accomplished in the field by temporarily contracting or deforming the sealing ring during placement through the bore 20 and then enabling it to expand to fully seat in the recess 32 between shoulders 40 and 42 and against outer surface 38. If tube 16 is already made up with coupling 12, the controlled overlap or protrusion of shoulder 16d relative to recess surface 42 is so relatively small that full proper seating may be accomplished. If some difficulty is encountered in fully seating the ring 18 in recess 32, the controlled inner portion engagement by tube end 14d will force the seal ring 18 into the fully seated position due to the height to width ratio. Proper seating of the seal ring 18 in the recess 32 between surfaces 40 and 42 may be easily and quickly verified visually. However, it may be preferable to ship the coupling to the well site with the seal ring 18 already installed.

Upon rotational make up of the tube into the coupling, the resilient seal ring 18 engages the oppositely facing annular ends or noses of the pipe or tube which readily compresses the height dimension of the resilient seal ring and forces it into a full seating relationship with the cylindrical outer surface 38 of the recess 32. This engagement also reliably forms the desired seal as the height and width ratio of the seal ring ensures proper placement and deformation of the seal ring 18.

It now will be recognized that a new and improved coupling assembly has been disclosed which meets all the objectives of the present invention. Since certain changes or modifications may be made in the disclosed embodiments without departing from the inventive concepts involved, it is the aim of the following claims to cover all such changes and modifications that fall within the true spirit and scope of the present invention.

What is claimed is:

1. A coupling member for joining lengths of first and second tubular conduits, each conduit having an annular nose operably positioned within the coupling member to form a well conduit, including:

a tubular coupling member defining a longitudinal axis and having a first annular end surface and a second annular end surface and having a longitudinally extending bore formed internally through said coupling member between said first annular end surface and said second annular end surface, said bore forming an inner surface;

said inner surface forming a first annular shoulder and a second annular shoulder within said bore, said first and said second annular shoulders being spaced apart a predetermined distance and facing in opposite longitudinal directions;

said inner surface forming an annular recess disposed between said oppositely facing annular shoulders, said recess having an outer cylindrical surface and a pair of facing annular surfaces disposed so the outer surface faces toward the center of the bore, said outer surface having an axial height between said facing annular surfaces;

a first helical internal thread means formed in said bore by said inner surface adjacent said first annular shoulder for threadedly engaging a corresponding helical external thread means formed on a first tubular conduit for releasably securing the first tubular conduit in coaxial longitudinal axis alignment with said tubular coupling member;

a second helical internal thread means formed in said bore by said inner surface adjacent said second annular shoulder for threadedly engaging a corresponding helical external thread means formed on a second tubular conduit for releasably securing the second tubular conduit in coaxial longitudinal axis alignment with said tubular coupling member;

said first annular shoulder engaging the first tubular member to limit rotational make up of said first helical internal thread means with the corresponding helical threads on the first tubular conduit for positioning the first tubular member in a predetermined height relationship to said recess;

said second annular shoulder engaging the second tubular member to limit rotational make up of said second helical internal threads with the corresponding helical threads on the second tubular conduit for positioning the second tubular member in a predetermined height relationship to said recess; and a resilient seal ring means for forming a corrosion barrier by sealing between the annular nose of the first tubular member and the annular nose of the second tubular member when each tubular member is positioned in the predetermined height relationship to said recess, said resilient seal ring means having a cylindrical inner surface and a cylindrical outer surface that are radially spaced apart to form a width dimension and defining a longitudinal axis, said seal ring means having a first flat annular surface and a second flat annular surface that are longitudinally spaced apart to form a seal ring height dimension that is substantially the same as the height dimension of said outer surface of said recess, said outer cylindrical surface of said seal ring sized for operably positioning adjacent said outer surface of said recess so the longitudinal axis of the seal ring is substantially coaxial with the longitudinal axis of said tubular coupling member, said seal ring means initially being substantially rectangular in cross section having a height substantially the same as the outer surface of said recess and a width that is at least 1.5 times the height prior to sealing engagement with the annular noses of the first and second tubular member;

said seal ring means sized to be operably compressively deformed in the height dimension adjacent the inner cylindrical surface by the annular noses of the tubular conduits to form the corrosion barrier seal when the tubular members are in the predetermined height relationship to said recess and with the height dimension of said seal ring adjacent the outer cylindrical surface remaining substantially undeformed in said recess to provide a generally T-shaped configuration to the deformed seal ring means.

2. The coupling assembly as set forth in claim 1, wherein:
said resilient seal ring means is formed of a corrosion resistent material.

3. The coupling assembly as set forth in claim 1, wherein:
said resilient seal ring having a width that positions said first annular surface of said resilient seal ring to form a continuous smooth unrestricted flow passage.

4. The coupling assembly as set forth in claim 1, wherein:
said outer surface of said seal ring having a constant diameter; and
said annular recess formed in said inner surface having a constant diameter that is substantially the same as the constant diameter of said outer surface of said seal ring means to insure a proper fit therebetween.

5. The coupling assembly as set forth in claim 1 wherein:
said inner surface of said recess having a longitudinal dimension that is substantially the same as the uniform height of said seal ring means to insure a proper fit therebetween.

6. A coupling assembly for joining lengths of tubular conduits to form a well conduit, including:

a tubular coupling member defining a longitudinal axis and having a first annular end surface and a second annular end surface and having a longitudinally extending bore formed internally through said coupling member between said first annular end surface and said second annular end surface, said bore forming an inner surface;

said inner surface forming a first annular shoulder and a second annular shoulder within said bore, said first and said second annular shoulders being spaced apart a predetermined distance and facing in opposite longitudinal directions;

a first tubular conduit member having an inner surface defining an internal fluid flow passage, an outer surface and an annular end surface;

said outer surface forming an external helical thread means and external shoulder engaging means for engaging said first annular shoulder of said tubular coupling member to limit movement of said first tubular conduit member into said bore of said tubular coupling member;

a second tubular conduit having an inner surface defining an internal fluid flow passage, an outer surface and an annular end surface, said outer surface forming an external helical thread means and external shoulder engaging means for engaging said second annular shoulder of said tubular coupling member to limit movement of said second tubular conduit into said bore of said tubular coupling member;

said inner surface of said tubular coupling member forming an annular recess disposed between said oppositely facing annular shoulders, said recess having an outer surface and a pair of facing annular surfaces defining the height of said recess and disposed so the outer surface faces toward the center of the bore of said coupling member;

said tubular coupling member having a first helical internal thread means formed in said bore by said inner surface adjacent said first annular shoulder for threadedly engaging said helical external thread means formed on said first tubular for releasably securing said first tubular conduit in coaxial longitudinal axis alignment with said tubular coupling member;

said tubular coupling member having a second helical internal thread means formed in said bore by said inner surface adjacent said second annular shoulder for threadedly engaging said helical external thread means formed on said second tubular conduit for releasably securing said second tubular conduit in coaxial longitudinal axis alignment with said tubular coupling member;

said first annular shoulder of said coupling member engaging said shoulder means on said first tubular member to limit rotational make up of said first helical internal thread means with said external helical threads on said first tubular conduit for positioning said annular end surface of said first tubular member in a predetermined relationship to said recess;

said second annular shoulder of said coupling member engaging said shoulder means on said second tubular member to limit rotational make up of said second helical internal threads with said external helical threads on said second tubular conduit for positioning said annular end surface of said second tubular member in a predetermined relationship to said recess; and a resilient seal ring means for forming a fluid seal between said annular end surface of said first tubular member and said annular end surface of said second tubular member when each said tubular member is positioned in the predetermined relationship to said recess, said resilient seal ring means having an inner cylindrical surface and an outer cylindrical surface that are radially spaced to form a width dimension and defining a longitudinal axis and, said seal ring means having a first annular surface and a second annular surface that are longitudinally spaced apart to form a seal ring height that is substantially the same as said outer surface of said recess, said outer surface of said seal ring sized for operably positioning adjacent said outer surface of said recess so the longitudinal axis of the seal ring is substantially coaxial with the longitudinal axis of said tubular coupling member, said seal ring means initially being substantially rectangular in cross section and having a height substantially the same as the outer surface of said recess and a width that is at least 1.5 times the height prior to sealing engagement with said annular end surfaces; and said seal ring means sized in the width dimension so said annular end surfaces of said first and second tubular members compressively deform the height dimension of said seal ring means adjacent said inner cylindrical surface of said seal ring when said annular end surfaces of said first and second tubular members are in the predetermined relationship to said recess to form the corrosion barrier seal with the height dimension adjacent said outer cylindrical surface remaining substantially undeformed in said recess to provide a generally T-shaped configuration to said deformed seal ring means.

7. The coupling assembly as set forth in claim 6, wherein:
said resilient seal ring means is formed of a corrosion resistent material.

8. The coupling assembly as set forth in claim 6, wherein:
said resilient seal ring having a width that positions said first annular surface of said resilient seal ring to form a continuous smooth unrestricted flow passage.

9. The coupling assembly as set forth in claim 6, wherein:
said outer surface of said seal ring having a constant diameter; and
said annular recess formed in said inner surface having a constant diameter that is substantially the same as the constant diameter of said outer surface of said seal ring to insure a proper fit therebetween.

10. The coupling assembly as set forth in claim 6 wherein:
said inner surface of said recess having a longitudinal dimension that is substantially the same as the height of said seal ring means to insure a proper fit therebetween.

11. A coupling assembly for operably connecting a pair of tubular conduits to form a well string, including;
a tubular coupling member having a longitudinally extending bore formed therethrough with said bore forming an inner surface having a recess forming a longitudinally extending height;

a first tubular conduit having a longitidinally extending bore formed therethrough for providing an internal flow passage, said first tubular conduit having on outer surface and an annular end surface;

a second tubular conduit having a longitudinally extending bore formed therethrough for providing an internal flow passage, said second tubular conduit having an outer end surface and an annular end surface;

thread means formed on said coupling member and each of said first and second tubular conduits for releasably securing said tubular conduits in an axially aligned flow communicating relationship upon thread make up;

shoulder means formed on said coupling member and each of said and second tubular conduits for positioning the annular end surface of said first and second tubular in a predetermined spaced apart distance;

a resilient seal ring disposed in said recess for sealing between said annular end surface of said first tubular conduit and said end surface of said second tubular conduit, said resilient seal ring prior to sealing having a substantially rectangular cross sectional with a radial width dimension equal to at least 1.5 times the longitudinal height dimension, said annular end surfaces of said tubular conduits sealingly deforming only a portion of the radial width dimension;

said resilient seal ring having a radially spaced inner surface and an outer cylindrical surface forming the height dimension of said seal ring, said inner surface of said resilient seal ring formed to provide a substantially smooth, continuous and unrestricted internal flow passage between said internal flow passages of said first and second tubular conduits, said resilient seal ring having a longitudinally extending height dimension substantially the same as said recess for ensuring proper placement and retention in said recess; said annular end surfaces of said first and second tubular conduits when in the predetermined spaced apart distance relationship sealingly engaging said resilient seal ring adjacent said inner surface to sealingly compress and deform the height of the portion of said seal ring therebetween to trap and maintain said seal ring in said recess.

* * * * *